United States Patent Office 2,723,248
Patented Nov. 8, 1955

2,723,248

FILM-FORMING COMPOSITIONS

George C. Wright, Bel Air, Md., assignor to General Aniline & Film Corporation, New York, N. Y., a corporation of Delaware No Drawing. Application October 1, 1954,
Serial No. 459,867

5 Claims. (Cl. 260—45.5)

The present invention relates to improved film-forming compositions comprising a mixture of polymeric N-vinyl lactam and a partial ester of an alkyl vinyl ether-maleic anhydride copolymer.

Polymeric N-vinyl lactams are colorless horn- or glass-like materials with a high softening point, and usually employed in solution form as textile assistants, finishing, thickening, sticking, or binding agents. They are also employed in the preparation of hair waving, setting, and dressing compositions. Films formed from such polymeric N-vinyl lactams, either from alcohol or aqueous solution, have a tendency to become tacky under conditions of high relative humidity. Although such polymeric materials are soluble in water and organic solvents, such as, lower alkyl alcohols, glycols, glycerine, aliphatic ketones, and the like, industrial applications have arisen requiring a film which would remain water insoluble but yet retain its original hygroscopicity and be tack-free under conditions of high humidity. Chemical attempts to bring about the latter physical conditions resulted in the material remaining insoluble in water and a large number of organic solvents, and resulting in a film which is either very hard or brittle.

It is an object of the present invention to provide a new composition comprising a mixture of polymeric N-vinyl lactam and a partial ester of an alkyl vinyl ether-maleic anhydride copolymer which will produce films having substantially reduced tackiness under conditions of relative high humidity.

It is a further object to provide such compositions from which the films remain water insoluble while retaining the desired hygroscopicity of the polymeric N-vinyl lactam and remain substantially tack-free under conditions of relative high humidity.

Other objects and advantages will become more clearly apparent from the following description.

I have found that compositions having the foregoing desirable properties are readily prepared by mixing from 3 to 30 per cent of a partial alkyl ester of an alkyl vinyl ether-maleic anhydride copolymer and 70 to 97 per cent of a polymeric N-vinyl lactam. The compositions thus prepared are not only useful in cosmetic applications but also useful as a component of aerosol-dispensed hair lacquers where a reduction of tackiness is desired. They are also useful for incorporation of infra-red, visible, or ultraviolet absorbers, optical brighteners of fluorescers, and casting into films. Other uses will be apparent from the specific working examples. It is to be noted that the concentration of 3 to 18 per cent of the partial alkyl ester of the alkyl vinyl ether-maleic anhydride copolymer in admixture with the polymeric N-vinyl lactam reduces the tackiness of the film under conidtions of high relative humidity. Compositions containing these concentrations are particularly adaptable for the preparation of aerosol-dispensed hair lacquers. Larger percentages ranging from 20 to 30 per cent of the partial alkyl ester of the alkyl vinyl ether-maleic anhydride copolymer in admixture with the polymeric N-vinyl lactam renders the film water insoluble and at the same time affords the opportunity of plasticizing the film with a liquid-ester type plasticizer so that the film remains water insoluble, retains hygroscopicity of the polymeric N-vinyl lactam and remains substantially tack-free under conditions of high relative humidity. The latter compositions are especially useful in applications such as films for food packaging, as film screens containing infra-red, visible, ultraviolet adsorbers, optical brighteners, or fluorescers, and films for finger nail polishes.

The foregoing compositions are all readily soluble in ethyl alcohol, and therefore, particularly adaptable for cosmetic applications. The unusual feature of the compositions prepared in accordance with the foregoing specified ratios is that the components when so mixed in organic solvents such as lower alkyl alcohols, acetone, dioxane, etc., no precipitation (cross-linkage) occurs, and the resulting solutions are stable if prepared within the said concentrations. Films may be prepared from the compositions containing the specified proportion of components and the properties (such as solubility, hygroscopicity, and tackiness) of the resulting compositions varied within these proportions. The most unusual feature, however, is that in the presence of water the films become very well plasticized, with good elasticity very quickly, and yet remain essentially insoluble with relatively high ratios of the partial ester of alkyl vinyl ether-maleic anhydride copolymer.

The polymeric N-vinyl lactam utilized in the preparation of the compositions of the present invention are characterized by the following general formula:

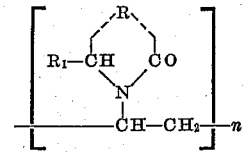

wherein R represents an alkylene bridge group necessary to complete a 5, 6 and 7-membered heterocyclic ring system, $R_1$ represents either hydrogen or a methyl group, and $n$ represents a number indicative of the extent of polymerization.

All of the specific polymeric materials characterized by the foregoing general formula are commercially available and called polymeric N-vinyl lactams. They are obtained by polymerizing organic 5, 6, and 7-membered ring compounds containing in their rings the

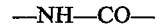

group, such as, for example, 1-vinyl-2-pyrrolidone, 1-vinyl-5-methyl-2-pyrrolidone, 1 - vinyl - 2 - piperidone, N-vinyl-ε-caprolactam, and the like. Depending upon the extent of polymerization, they have molecular weights ranging from 500 to 200,000. Viscosity measurements are used as an indication of the average molecular weight of the polymers which are characterized by a chain of carbon atoms to which the lactam rings are attached through their nitrogen atoms:

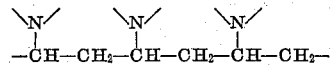

The viscosity coefficient K, which is fully described in Modern Plastics, 23, No. 3, 157–61, 212, 214, 216, 218 (1945) is calculated as follows:

$$\frac{\log_{10} \eta \text{ rel}}{C} = \frac{75K^2}{1+1.5KC} + K$$

where C is the concentration in grams per 100 cc. of polymer solution and $\eta$ rel is the ratio of the viscosity of the solution to that of pure solvent. The K values are reported as 1000 times the calculated viscosity coefficient in order to avoid the use of decimals. For the purpose of the present invention, I may employ those polymers having a K value of 10 to 100, preferably of 30 to 100 because of their viscosity at lower concentrations.

The number of recurring polymer units enclosed by brackets in the foregoing general formula, indicated by $n$ the extent or degree of polymerization, corresponds to a chain of 192 to 980 monomer units. In actual practice, a mixture of polymer each containing a different number ($n$) of monomer units is always produced. The polymers are readily prepared by the procedural steps given in United States Patents 2,265,450, 2,317,804 and 2,335,454 and in which working examples of all the species characterized by the above formula are given and all of which are incorporated herein by reference to said patents.

The partial alkyl esters of alkyl vinyl ether-maleic anhydride copolymers which may be mixed with the foregoing polymeric N-vinyl lactams are characterized by the following general formula:

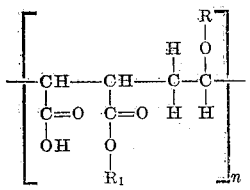

wherein R represents an alkyl group of 1 to 4 carbon atoms, e. g., methyl, ethyl, propyl, isopropyl, butyl and isobutyl, $R_1$ represents an alkyl group of 4 to 8 carbon atoms, e. g., butyl, isobutyl, pentyl, hexyl, heptyl, octyl, isooctyl, etc., and $n$ represents a number indicative of copolymerization as determined by specific viscosities which range from 0.36 to 10.

The alkyl vinyl ether-maleic anhydride copolymers employed in the preparation of the foregoing partial alkyl esters are well known artificial resins, and are obtained by the known methods of copolymerizing maleic anhydride with a vinyl lower alkyl ether in which the alkyl group has not more than 4 carbon atoms, as described in United States Patent 2,047,398 and many other patents too numerous to mention. The resulting polymers are partially esterified in the manner known to yield the partial or half ester.

The following are illustrative examples of such copolymers which are readily converted to the partial or half ester. It is desirable that the copolymer have a molecular weight of at least 10,000 and in the range of 10,000 to 150,000 as determined by specific viscosity measurements, which range from 0.36 to 10.0 (1 gram of copolymer dissolved in 100 ml. of 2-butanone at 25° C.):

Vinyl methyl ether-maleic anhydride copolymer having a specific viscosity of 0.4 to 10.

Vinyl ethyl ether-maleic anhydride copolymer having a specific viscosity of 0.4 to 10.

Vinyl n-propyl ether-maleic anhydride copolymer having a specific viscosity of 0.4 to 10.

Vinyl isopropyl ether-maleic anhydride copolymer having a specific viscosity of 0.4 to 10.

Vinyl n-butyl ether-maleic anhydride copolymer having a specific viscosity of 0.4 to 10.

Vinyl sec.-butyl ether-maleic anhydride copolymer having a specific viscosity of 0.4 to 10.

Vinyl tert. butyl ether-maleic anhydride copolymer having a specific viscosity of 0.4 to 10.

It is to be noted that all of the molecules of the same batch of the vinyl lower alkyl ether-maleic anhydride copolymer do not have the same $n$ but there is quite a distribution around some average value. It is quite difficult and time consuming to determine either the average $n$ or the shape of the distribution curve. Accordingly, in order to provide some indication as to how batches of the copolymers compare with each other with respect to $n$, the thickening effect that a fixed amount of copolymer has when dissolved in a particular solvent is determined. For this purpose, conventional procedures are followed and the results reported as specific viscosity, which is always measured at a concentration of 1 gram of copolymer, i. e., prior to partial esterification per 100 mls. of 2-butanone solution at 25° C. The formula is as follows:

$$\text{Specific viscosity} = \frac{\text{viscosity of the solution at 25° C.}}{\text{viscosity of 2-butanone at 25° C.}} - 1$$

From this formula it can be seen that the specific viscosity scale starts at zero. If three samples of polymers having the same structure, except for $n$, have specific viscosities of 1, 2 and 3, respectively, we assume that in this series the first sample had the lowest average $n$ and that the third sample had the highest average $n$.

The partial alkyl esters of the foregoing copolymers are prepared in the conventional manner. When such an anhydride copolymer undergoes esterification with an equimolar amount of a monohydric alcohol, such as, butyl, isobutyl, pentyl, hexyl, heptyl, octyl, isooctyl alcohol, etc., including 2-butanol, 2-pentanol, 3-pentyl, 2-methyl-1-butanol, 3-methyl-2-butanol, and the like, a half ester is formed and no by-products. Anhydrides have a strong tendency to react with alcohols so far as the half ester stage. Such reactions are considerably more rapid than the esterification of a carboxylic acid by an alcohol under comparable conditions. Since it is sometimes difficult to prepare full esters from the anhydride copolymers by direct esterification because of steric hindrance, the preparation of the half ester is much more simplified. Accordingly, therefore, to prepare the partial or half esters of the foregoing alkyl vinyl ether-maleic anhydride copolymers, all that is necessary is to reflux a solution of the copolymer is acetone with an equivalent amount of the required alkyl alcohol.

To illustrate the process utilized in such preparation, the following example is illustrative:

Into a 1-liter 3-necked flask equipped with a condenser, thermometer and a stirrer, 72 grams of isobutyl alcohol (.97 mole) and 192 grams (.97 unit mole) of isobutyl vinyl ether-maleic anhydride copolymer and 140 grams of acetone were added, and the mixture allowed to reflux for about one hour in order to allow the isobutyl alcohol to react with one-half of the anhydride groups in said polymer. Then 100 grams of water were added and the refluxing continued for about 4 hours longer in order to allow the maleic anhydride groups to hydrolyze into carboxyl groups. The partial or half ester was precipitated portionwise by adding 50 ml. portions of the copolymer to 250 ml. portions of carbon tetrachloride in a Waring blender and stirred vigorously for several minutes. The soft precipitated resin was shredded by hand, desolvated in vacuo and finely ground into a powder.

By following the foregoing procedure, following half esters were prepared:

½ butyl ester of methyl vinyl ether-maleic anhydride copolymer

½ pentyl ester of vinyl ether-maleic anhydride copolymer

½ octyl ester of isopropyl vinyl ether-maleic anhydride copolymer

½ isooctyl ester of isopropyl vinyl ether-maleic anhydride copolymer

In practicing the present invention, the two essential components, i. e., half ester of the alkyl vinyl ether-maleic anhydride copolymer and the polymeric N-vinyl lactam are merely dissolved in the lower alkyl alcohol, such as, for example, methyl, ethyl, propyl, isopropyl alcohol, and the like in the proportions aforestated. The two components may be individually dissolved in the alcohol and mixed together to yield the desired solution. The dissolving of the two components in the alcohol is readily accomplished at room temperature. Various blends of each of the components in a suitable alcohol may be blended so as to arrive at a composition in which the partial alkyl ester is present in a range of 3 to 30 per cent, and the polymeric N-vinyl lactam present in the range of 70 to 97 per cent. Other adjuvants, such as, diethylene glycol, ethylene glycol, glycerol, half methyl ether of diethylene glycol, and the like, may be added to impart plasticity to the composition where the proportion of the partial ester of the alkyl vinyl ether-maleic anhydride is above 25%.

The following examples will serve to illustrate how the novel compositions of the present invention are prepared. It is to be understood, however, that they are merely illustrative and are not to be construed as being limitative. All the parts are by weight unless otherwise specified.

Example I

A clear, light yellow, fairly viscous, ethyl alcohol solution of 4.8 parts of the copolymer of methyl vinyl ether-monobutyl maleate (½ butyl ester of methyl vinyl ether-maleic anhydride copolymer prepared from methyl vinyl ether-maleic anhydride copolymer of specific viscosity of 0.02) and 95 parts of polyvinyl pyrrolidone having a K value of 75 was prepared at room temperature. 5 ml. of this solution were placed in a 5 cm. tared weighing dish and dried for 55 hours in a vacuum desiccator over calcium chloride under an absolute pressure of approximately 50 mm. of mercury. The dried film was clear and colorless. It was weighed and aged for 6 days at 60% relative humidity. It gained 0.94 times as much water as an alcoholic solution of polyvinyl pyrrolidone of the same K value used as a control film. The resulting film was coherent, clear, colorless, slightly tacky and did not adhere to glass. The control film was very tacky and adhered to glass.

The above composition was employed as a component of an aerosol-dispensed hair lacquer where a reduction of tackiness was highly desirable. The film was easily removed from the hair by one washing with water.

Example II

Example I was repeated with the exception that 4.8 parts of the copolymer of methyl vinyl ether-monobutyl maleate and 95 parts of polyvinyl pyrrolidone were replaced by 13 parts and 87 parts, respectively. The resulting film was the same in all respects but slightly less tacky at 100% relative humidity, and 0.86 times as hygroscopic as the film of polyvinyl pyrrolidone. The film formed a stable dispersion when shaken with 0.1% Ivory soap solution.

The above composition was employed as a component of an aerosol-dispensed hair lacquer where a relatively large reduction of tackiness was necessary. The film was readily removed from the hair by a washing with shampoo containing soap as a synthetic detergent.

It is to be noted that the compositions of Examples I and II are exceptionally useful for application to glass as an adhesive layer.

Example III

A clear, light yellow, fluid, ethyl alcohol solution of 70 parts of polyvinyl pyrrolidone having a K value of 32 and 12 parts of the copolymer of methyl vinyl ether-monobutyl maleate having a specific viscosity of 0.92 and 18 parts of diethylene glycol was prepared at room temperature. The solution was cast in a silicone-coated paper cup and dried for 13 days over calcium chloride under an absolute pressure of approximately 50 mm. of mercury. The resulting film was approximately 40 mils thick, clear, light yellow, well plasticized and only slightly tacky. When the film was rubbed with a few drops of water with the finger it remained clear and homogenous, and was only slightly tacky. When the film of the polyvinyl pyrrolidone used as a control was rubber with water the material became very tacky and adhered tenaciously to the fingers.

The foregoing composition is especially adaptable as a component of aerosol-dispensed hair lacquers since it is only slightly tacky over a wide range of relative humidity, and this keeps the hair groomed under all conditions without become brittle or too tacky.

Example IV 60 parts of polyvinyl pyrrolidone having a K value of 32, 19 parts of the copolymer of methyl vinyl ether-monobutyl maleate having a specific viscosity of 2.5 and 21 parts of diethylene glycol were dissolved in 200 parts of ethyl alcohol. From this solution two films were cast in glass weighing dishes and dried over calcium chloride at an absolute pressure of approximately 50 mm. of mercury for one week. During this period the per cent of relative humidity was estimated at 4 to 11. The resulting films were roughly 6 mils thick. They were clear, colorless, fairly well plasticized and tack-free.

The films were then aged at 100% relative humidity for a period of 3 days, and were found to be clear, colorless, with good elasticity, water soluble and only slightly tacky. As a control, a 60% solution of polyvinyl pyrrolidone in ethyl alcohol became very tacky and resembled a concentrated solution of polyvinyl pyrrolidone in consistency, and was only 70% as hygroscopic as the plasticized film. The hygroscopicity was measured by gain in weight from picking up moisture. This composition is particularly adaptable for the preparation of film screens containing infra-red, visible, or ultraviolet absorbers, optical brighteners, fluorescers, and the like.

Example V

An ethyl alcohol solution was prepared containing 45 parts of polyvinyl pyrrolidone having a K value of 60, 24 parts of the half ester of Example I and 31 parts of diethylene glycol. The solution was cast into films and dried. The resulting dried film was roughly 6 mils thick, clear, colorless, well plasticized and tack-free. At 100% relative humidity for 3 days the film was clear, colorless, well plasticized with good elasticity and only slightly tacky. It was water insoluble. The film was 1.50 times as hygroscopic as a similar film prepared from an alcoholic solution of polyvinyl pyrrolidone of the same K value used as a control.

The above composition is particularly adaptable for casting films for fruit packaging and film screens containing infra-red, ultraviolet absorbers, optical brighteners, etc. and for the preparation of medical sutures and drainage tubes.

Example VI 45 parts of polyvinyl pyrrolidone having a K value of 60, 24 parts of a copolymer of methyl vinyl ether-monbutyl maleate (prepared from a copolymer of methyl vinyl ether-maleic anhydride having a specific viscosity of 1.03) and 31 parts of diethylene glycol were dissolved in 200 parts of ethyl alcohol. A film was cast and dried. The dried film (after 2 weeks) was 12 mils thick, clear, colorless, well plasticized, slightly tacky, and water insoluble.

The foregoing composition is particularly adaptable for the preparation of films for fruit packaging and for the preparation of films containing infra-red, ultraviolet absorbers, optical brighteners, fluorescers and for medical sutures and drainage tubes.

I claim:

1. An improved film forming composition comprising 70 to 97 per cent of a polymeric N-vinyl lactam and 3 to 30 per cent of a partial alkyl ester of a copolymer having the following general formula:

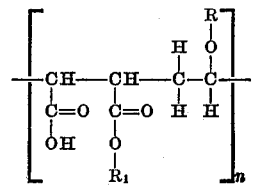

wherein R represents an alkyl group of 1 to 4 carbon atoms, $R_1$ represents an alkyl group of 4 to 8 carbon atoms, and $n$ represents a number indicative of copolymerization as determined by specific viscosities ranging from 0.36 to 10.

2. A composition according to claim 1, wherein the polymeric N-vinyl lactam is poly-1-vinyl-2-pyrrolidone.

3. A composition according to claim 1, wherein the polymeric N-vinyl lactam is poly-1-vinyl-2-piperidone.

4. A composition according to claim 1, wherein the polymeric N-vinyl lactam is poly-1-vinyl-5-methyl-2-pyrrolidone.

5. A composition according to claim 1, wherein the polymeric N-vinyl lactam is poly-N-vinyl-ε-caprolactam.

No references cited.